(12) United States Patent
Mino

(10) Patent No.: US 8,703,257 B2
(45) Date of Patent: Apr. 22, 2014

(54) WATER STORAGE STRUCTURE AND METHOD FOR FORMING THE SAME

(75) Inventor: Norihisa Mino, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/219,902

(22) Filed: Aug. 29, 2011

(65) Prior Publication Data

US 2011/0311740 A1    Dec. 22, 2011

Related U.S. Application Data

(63) Continuation of application No. PCT/JP2010/000454, filed on Jan. 27, 2010.

(30) Foreign Application Priority Data

Mar. 4, 2009    (JP) ................................ 2009-050034

(51) Int. Cl.
*B32B 1/00*    (2006.01)
*B32B 1/02*    (2006.01)

(52) U.S. Cl.
USPC ........ 428/34.1; 428/34.4; 428/35.7; 428/36.4

(58) Field of Classification Search
USPC .......... 428/34.1, 34.4–34.7, 35.7, 36.4–36.92
See application file for complete search history.

(56) References Cited

U.S. PATENT DOCUMENTS

| | | |
|---|---|---|
| 5,383,943 A | 1/1995 | Ogawa et al. |
| 5,472,458 A | 12/1995 | Ogawa et al. |
| 5,580,192 A | 12/1996 | Ogawa et al. |

FOREIGN PATENT DOCUMENTS

| | | |
|---|---|---|
| EP | 1 203 525 A1 | 5/2002 |
| JP | 6-62666 | 3/1994 |
| JP | 6-75151 | 3/1994 |
| JP | 6-105622 | 4/1994 |
| JP | 6-113674 | 4/1994 |
| JP | 6-335323 | 12/1994 |
| JP | 2649481 | 5/1997 |
| JP | 2000-26844 | 1/2000 |
| JP | 2003-210923 | 7/2003 |
| JP | 2005-13824 | 1/2005 |
| JP | 2007-77201 | 3/2007 |
| WO | 00/62596 | 10/2000 |

OTHER PUBLICATIONS

Entry of "Contact Angle" from Wikipedia.com, 5 pages, accessed Dec. 18, 2012.*
Wikipedia.com entry for "sand", Wikipedia.com, accessed Jun. 14, 2013, 5 pages.*
International Search Report issued Apr. 27, 2010 in corresponding International Application No. PCT/JP2010/000454.

* cited by examiner

*Primary Examiner* — Walter B Aughenbaugh
(74) *Attorney, Agent, or Firm* — Wenderoth, Lind & Ponack, L.L.P.

(57) ABSTRACT

A water storage structure includes a water-repellent layer having a water-repellent surface and a water storage section above the water-repellent layer. The water-repellent layer is composed of a collection of small objects having water repellency in surfaces thereof, and the small objects contact each other at multiple points to form a configuration that prevents water from passing through the water-repellent layer.

16 Claims, 7 Drawing Sheets

WATER STORAGE STRUCTURE AND METHOD FOR FORMING THE SAME

This application is a continuation of International Application No. PCT/JP2010/000454, filed Jan. 27, 2010.

BACKGROUND OF THE INVENTION

1. Field of the Invention

The present invention relates to a water storage structure composed of a collection of small objects having properties of repelling water or the like.

2. Description of the Background Art

The world's population, which was 1.5 billion at the beginning of the 20th century, has exceeded 6 billion in the 21st century. The increase rate will not fall and the world's population will reach 9 billion at 2050, and thus the earth will have a population that is six times as much as that at the beginning of the 20th century. Meanwhile, the desert, which is unsuitable for cropland, occupies 30% of the land of the earth, further desertification of cropland has occurred, and thus the cropland tends to decrease.

If plants can be grown in the desert, improvement of the land gradually progresses from the plants, and the number and kinds of plants that grow can be increased. First, for a barren land, it is necessary to build ground conditions under which plants continue to live. The most essential thing as a condition under which plants continue to live in a desert is water, and a measure to sufficiently secure water and supply the water is desired.

As conventional art, there is a method in which a water retention material is mixed with a dry land to adhere to roots of plants, and there are also the following techniques as preceding techniques.

Patent Literature 1 describes a method in which a hydrophobic layer composed of hydrophobic particles is provided in soil at a predetermined depth from the ground surface for controlling an amount of water in the soil. It provides a mechanism for controlling evaporation of water from desert soil.

In addition, Patent Literature 2 describes a soil block for potted plant cultivation that includes a water retaining layer, a hydrophobic layer above the water retaining layer, and a soil layer above the hydrophobic layer. Patent Literature 2 provides a soil block for potted plant cultivation that retains an appropriate amount of water for a long period of time and that allows easy water management, and a method for cultivating a potted plant by using the same.

Further, Patent Literature 3 describes an artificial soil structure that includes a water permeating layer in soil, a gravel layer present above or surrounding the water permeating layer, a hydrophobic layer that is present above the gravel layer and that is composed of hydrophobic particles, and an upper layer present above the hydrophobic layer. In Patent Literature 3, a specific combination of a water permeating layer and a hydrophobic layer is provided to a geological layer structure constituting soil, whereby necessary water is secured and efficiently supplied to the upper layer of the soil in which agricultural products are cultivated. By so doing, a soil environment suitable for plant cultivation is provided to drylands, such as desert, where farming previously could not be done. Sea water circulated to the water permeating layer is used to supply necessary water to the upper layer in which agricultural products grow.

Further, Patent Literature 4 describes an artificial water retaining soil structure that is composed of: a soil including a water retention agent; and a hydrophobic layer above the soil that is composed of hydrophobic particles. Patent Literature 4 provides an artificial water retaining soil structure that can mainly control evaporation of water in soil, a method for manufacturing the same, and a method concerning suppression of water evaporation in soil.

CITATION LIST

Patent Literature

[PTL 1] Japanese Laid-Open Patent Publication No. 6-113674
[PTL 2] Japanese Laid-Open Patent Publication No. 6-105622
[PTL 3] Japanese Laid-Open Patent Publication No. 6-335323
[PTL 4] Japanese Laid-Open Patent Publication No. 6-62666
[PTL 5] Japanese Laid-Open Patent Publication No. 2000-26844
[PTL 6] Japanese Laid-Open Patent Publication No. 2007-77201
[PTL 7] Japanese Laid-Open Utility Model Publication No. 6-75151
[PTL 8] Japanese Laid-Open Patent Publication No. 2003-210923
[PTL 9] Japanese Laid-Open Patent Publication No. 2005-13824

SUMMARY OF THE INVENTION

Problems to be Solved by the Invention

However, in the case of Patent Literature 1, in a growth experimental device having a configuration in which plants root in a soil directly linked with a leaf soil layer through a wire mesh, a water-repellent sand layer is provided above the leaf soil layer and is not provided in the soil portion, and a plastic wall called a plastic pot is provided at the boundary between the water-repellent sand layer and the soil. When feeding water to a plant, water present in the leaf soil layer and the soil is supplied through the water-repellent sand layer and a sand layer to the plant. This supply form is a normal supply form, and is not a form of positively supplying water.

Further, in the case of Patent Literature 2, in the form where the hydrophobic layer and the soil layer are provided above the water retaining layer, a mechanism for supplying water to the soil layer in which plants grow has only a supply path from the water retaining layer through the hydrophobic layer to the soil layer, and the hydrophobic layer does not exhibit complete hydrophobicity.

Further, in the case of Patent Literature 3, the artificial soil structure has a configuration in which the hydrophobic layer is provided between the upper layer in which plants grow and the water permeating layer for supplying water. Similarly to the foregoing examples, there is only a path through which water flows from the water permeating layer through the hydrophobic layer to the upper layer. The specification of Patent Literature 3 states that water is supplied from the water permeating layer to the upper layer. It is inferred that the hydrophobic layer in Patent Literature 3 allows water to pass therethrough.

Further, in the case of Patent Literature 4, the water-repellent layer composed of the water-repellent particles is formed above the soil including the water retention agent. The water-repellent layer is provided above the soil for suppressing evaporation of water in the soil, but a form of positively supplying water to the soil is not provided.

Further, in the case of Patent Literature 5, it is composed of a hydrophobized inorganic fine power, a silicone resin binder, and an oil. The oil coats the binder and exposed surfaces of the inorganic fine power included in the binder, and water contacts the oil surface. When the drawings of Patent Literature 5 are viewed, the above configuration is formed as a coating film on a substrate, and thus it is thought that water cannot pass therethrough. The configuration is obviously different from the configuration of the present invention.

Further, in the case of Patent Literature 6, a sheet is provided in which particles of a water-repellent resin are distributed to a base polymer. The base polymer is a solid in the range of material described in Patent Literature 6 and, of course, the particles are also solids. Thus, it is thought that it is appropriate to think that the configured sheet has no space through which water passes.

Further, in the case of Patent Literature 7, there is a description that feces flow down to a reservoir chamber through a region that is filled with a water-repellent member. The region in Patent Literature 7 that is filled with the water-repellent member allows feces to pass therethrough. Although not described in the specification, it is inferred that urine that is similar to water and an aqueous solution of the present invention is allowed to pass through the region. Therefore, Patent Literature 7 has not come to perceive the water storage structure of the present invention.

The hydrophobic layer used in the conventional configuration as described above is intended to suppress water evaporation and to suppress salinity passage of sea water, and with regard to securing water that is essential for growth of plants, there is a subject that the essential measure to positively store water and supply the water to plants has not been taken.

In such a circumstance, an object of the present invention is to provide a water storage structure that includes a collection of small objects having properties of repelling water or the like for positively storing water and supplying the water to plants.

Solution to the Problems

In order to solve the aforementioned problems of the conventional art, a first aspect of the present invention is a water storage structure for storing water or the like. The water storage structure comprises a water-repellent layer having a water-repellent surface; and a water storage section above the water-repellent layer. The water-repellent layer is composed of a collection of small objects having water repellency in surfaces thereof, and the small objects contact each other at multiple points to form a configuration that prevents water from passing through the water-repellent layer. According to this aspect, an effective water storage structure can be configured.

Further, in order to solve the aforementioned problems of the conventional art, a second aspect of the present invention is the water storage structure for storing water or the like, in which the water storage section is composed of water and air.

Further, in order to solve the aforementioned problems of the conventional art, a third aspect of the present invention is the water storage structure for storing water or the like, in which the water storage section is composed of a solid having a hydrophilic surface, and water or an aqueous solution passes through the water storage section. According to this aspect, a more effective water storage structure can be configured.

Further, in a fourth aspect of the present invention, a recess is formed in a surface of the water-repellent layer. According to this, a more effective water storage structure can be configured.

Further, a fifth aspect of the present invention is the water storage structure according to any one of the first to third aspects, in which most of the small objects have substantially the same size. According to this aspect, it is possible to enhance the state where the small objects contact each other at multiple points, and a substantially continuous network structure can further efficiently be configured.

Further, a sixth aspect of the present invention is the water storage structure according to the fifth aspect, in which sizes of many of the small objects are in a range of about 2 mm to about 0.015 mm. According to this aspect, it is possible to enhance the state where the small objects contact each other at multiple points, and a substantially continuous network structure can further efficiently be configured.

Further, a seventh aspect of the present invention is the water storage structure according to the sixth aspect, in which the sizes of the small objects have a plurality of quantity distributions of size. According to this aspect, the contacting points can efficiently be increased.

Further, an eighth aspect of the present invention is the water storage structure according to any one of the first to third aspects, in which shapes of the small objects are substantially spherical. According to this aspect, effective contacting points can be formed.

Further, a ninth aspect of the present invention is the water storage structure according to any one of the first to third aspects, in which many of the small objects include substantially the same component. According to this aspect, the property of repelling water or the like can uniformly be formed in any small object.

Further, a tenth aspect of the present invention is the water storage structure according to the ninth aspect, in which each small object is composed of a collection of a plurality of components. According to this aspect, the property of repelling water or the like can effectively be formed in any small object.

Further, an eleventh aspect of the present invention is the water storage structure according to the ninth aspect, in which a principal component of each small object is silicon oxide or an aluminosilicate. According to this aspect, the property of repelling water or the like can be maintained for a long period of time.

Further, a twelfth aspect of the present invention is the water storage structure according to the ninth aspect, in which a property of repelling water or the like that is possessed by each small object is present at least in a surface of each small object or between the surface and a vicinity of the surface within a range of depth of about 10 micrometers to about 1 nanometer. According to this aspect, the range where the property of repelling water or the like is exhibited can be clarified and the effect can be enhanced.

Further, a thirteenth aspect of the present invention is the water storage structure according to the twelfth aspect, in which the property of repelling water or the like that is possessed by each small object is exhibited by an organic functional group present in the surface of each small object and the vicinity of the surface. According to this aspect, the material that provides the property of repelling water or the like can be clarified.

Further, a fourteenth aspect of the present invention is the water storage structure according to the thirteenth aspect, in which the organic functional group has a structure based on a hydrocarbon or a fluorocarbon. According to this aspect, the specific functional group is indicated to allow the effect to be made clear.

Further, a fifteenth aspect of the present invention is the water storage structure according to the fourteenth aspect, in which the organic functional group having the structure based on the hydrocarbon or the fluorocarbon forms a Si—O (silanol) bond in silicon oxide or an aluminosilicate that is a principal component of each small object and in at least a part of each small object.

Further, a sixteenth aspect of the present invention is the water storage structure according to any one of the first to third aspects, in which the water or the like is water, an aqueous solution, or a water dispersion. According to this aspect, the effect can be maintained.

Further, a seventeenth aspect of the present invention is the water storage structure according to the third aspect, in which the solid having the hydrophilic surface is an inorganic oxide and a salt that include silicon oxide, a silicate, or an aluminosilicate as a principal component, and a water absorbing polymer compound. According to this aspect, a measure to enhance the water storage effect can be provided.

Moreover, an eighteenth aspect of the present invention is a method for forming a water storage structure, comprising a process of providing a property of repelling water or the like to small objects; and a process of collecting the small objects within a certain range to make the small objects contact each other, and the processes are in order performed to provide a property of storing water or the like. According to this aspect, the method for forming a water storage structure can be clarified.

Further, a nineteenth aspect of the present invention is the method for forming a water storage structure according to the eighteenth aspect of the present invention, in which the process of providing the property of repelling water or the like to the small objects is, as a specific method, a dip coating method, a spray coating method, an electrostatic-coating method, a rubbing coating method, a cast method, and an electrolytic polymerization method. According to this aspect, the specific method for providing the property of repelling water or the like to the small objects can be clarified to indicate that there is an effect.

Further, a twentieth aspect of the present invention is the method for forming a water storage structure according to the eighteenth aspect of the present invention, in which the process of providing the property of repelling water or the like to the small objects comprises, as a specific operation, a process of depositing a substance having a property of repelling of water or the like on surfaces of the small objects, and more specifically, is a thermal-spraying coating method, a vacuum deposition method, a chemical vapor deposition method, and a sputtering method. According to this aspect, the property of repelling water or the like can be deposited.

Further, a twenty-first aspect of the present invention is the method for forming a water storage structure according to the eighteenth aspect of the present invention, in which the process to make the small objects contact each other is, as a specific operation, an operation of compressing the small objects to make the small objects contact each other, an operation of providing vibrations to the small objects to make the small objects contact each other, or an operation of wetting surfaces of the small objects with a liquid that can wet the small objects, filling the liquid between the small objects, and then removing the liquid to make the small objects contact each other. It is also possible to define a range where the operation of compression, vibration, or the like is performed. According to this aspect, an efficient network structure can be constructed.

Advantageous Effects of the Invention

In the water storage structure according to the present invention, the individually separable small objects having properties of repelling water or the like are collected to make the small objects contact each other, whereby a network structure can be provided. As a result, when the water storage structure is provided at a place where plants will be cultivated or as a storage reservoir near the place where plants will be cultivated, it is possible to store water that is essential for the growth of plants.

Further, the present invention can efficiently supply stored water to plants, when a water storage structure is formed which has a configuration in which objects made of a material having wettability to water or the like are overlaid on the water storage structure. Further, the water storage structure of the present invention is adaptable to the case where plants growing in the future root more widely.

Further, in the forming method of the present invention, a pressure is applied to the collection of the small objects having properties of repelling water or the like, whereby it is possible to two-dimensionally form a substantially continuous structure of a property of repelling water or the like and further to three-dimensionally form a network structure.

Although emphasis is put on securing water for plants as the effect of the invention, of course, it is also possible to secure water that is used for drinking by livestock or humans, and it is possible to use water in many ways even at places where water has not been able to be secured.

DESCRIPTION OF THE PREFERRED EMBODIMENTS

Hereinafter, embodiments of the present invention will be described.

The present invention is a structure for storing water or the like. The place where water or the like is stored is not limited, and in order to allow installation also at any place needed, it has to be previously designed. Therefore, the water storage structure is designed to be composed of a collection of small objects that are individually separable. In addition, it is thought that a structure can also be realized in which a configuration, in which respective small objects are inseparably unified by a certain operation, is formed to exhibit a water storage property. However, there is a high possibility that the place where the present invention is implemented will be a place that is poor in energy and resources for performing the above-specified operation, and thus such a design is avoided and a design is made such that a water storage effect is exhibited by only gathering of small objects. Therefore, the small objects do not bond to each other.

Therefore, even though the small objects constitute the structure, the small objects can be individually separated. However, in order to maintain the structure without individually separating the small objects as much as possible, at least the weights of the respective small objects have to be made substantially the same to avoid the influence by external force such as gravity as much as possible. Here, although it is thought that it is necessary to define the assumed weight, the structure collapses due to the influence of external force such as gravity only in the case where the small objects have various weights, and it is not necessary to define the absolute value of the weight.

The present invention is the water storage structure, and the structure is composed of a collection of small objects. Therefore, the small objects need to have properties of repelling water or the like. Repelling water or the like refers to a state where a contact angle formed on the surface of the small object with water or the like exceeds 90 degrees. When a finely rugged shape is present in the surface of the small object with this surface energy state ensured, the contact angle increases further, and water or the like is repelled further.

The water storage structure of the present invention is composed of a collection of small objects that are individually separable and that have properties of repelling water or the like. In order that such small objects gather to form a water storage structure as a whole, a surface having a property of repelling water or the like has to be formed so as to completely eliminate portions through which water or the like passes. For that purpose, it is essential that the small objects densely contact each other and this state is continuous. It is also necessary that the small objects continuously and densely contact each other inside the water storage structure to form a network state. When this network state can be formed, even if water or the like leaks at a part, it is possible to suppress the leakage inside the water storage structure.

The water storage structure of the present invention is composed of a collection of separable small objects. The properties of repelling water or the like that are possessed by the respective small objects are continuously connected to each other in a network pattern, thereby securing a water storage property. Therefore, in order to realize a network structure, the sizes of the small objects have to be substantially the same. When small objects having substantially the same size are present, a water storage structure can be realized in which the small objects densely contact each other. If the sizes of the small objects are not uniform, the thickness of the intended water storage structure needs to be considerably large.

The sizes of the small objects are in the range of 2 mm to 0.015 mm. This is because even when the small objects have properties of repelling water or the like and densely contact each other, if the sizes exceed 2 mm, gaps occur between the small objects and thus there is an increased possibility that water or the like will pass therethrough. If science progresses most and a thick film having a property of repelling water or the like can be formed so as to be able to fully close gaps between even small objects having sizes exceeding 2 mm, the sizes may exceed the maximum numerical value. On the other hand, the minimum value, 0.015 mm, is a limit produced based on the problem of the buoyancy caused on the basis of the specific gravities of the small objects and water or the like. Although described above concerning the weights of the small objects, the phenomenon occurs that the small objects receive buoyancy from water or the like to become easy to move. When the small objects easily begin to move, it becomes difficult to maintain the above surface that repels water or the like, and leakage of water or the like occurs. This numerical limitation is largely based on the specific gravity of the material of the small objects. The minimum size of the small objects changes if the small objects are made of a material with a high specific gravity such as iron.

In the present invention, it is essential that the small objects densely contact each other. Small objects of the same size contact each other, whereby the water storage structure can be realized. Small objects having different sizes are used in combination, whereby a water storage structure can be realized in which the small objects more densely contact each other. It should be noted that even when the sizes of the small objects are within the above-mentioned numerical value range, it is not preferred if the sizes are random, and it is preferred if the sizes have a plurality of distributions.

The small objects densely contact each other to spread the property of repelling water or the like in a network pattern, and as a result, a water storage structure can be formed. However, if the shapes of the small objects are not uniform, the intended water storage structure cannot be formed, or a considerable thickness is required in order to obtain the intended water storage structure. Therefore, the thickness can be reduced to minimum by making the shapes substantially spherical, and as a result, the amount of the material of the small objects and the amount of treatment can be reduced, resulting in a reduction of the cost.

The small objects need to have properties of repelling water. Each of the small objects is desired to have a property of repelling water, and thus it is preferred if components of the small objects are substantially the same. However, each small object does not need to be composed of one component, and even when each small object is composed of a plurality of components in a state of equally having a property of repelling water or the like, the water storage structure can be realized.

The components of the small objects are not necessarily particularly limited as long as they have properties of repelling water or the like. However, from results of some measures taken so far, it is determined that the principal component as a preferable combination is silicon oxide, a silicate, or an aluminosilicate. Here, although it is thought that there are some overlapping compounds in the classification of silicon oxide, silicate, and aluminosilicate, they are listed with awareness of the possibility of the overlap. For example, there is a classification table in which silicon oxide is included in the silicate classification. In addition, there is a classification table in which aluminosilicate is one of the classifications of silicate. Here, an aluminosilicate is a substance that can be represented by $xM_2O \cdot yAl_2O_3 \cdot zSiO_2 \cdot nH_2O$, where M is an alkali metal or the like. The lowercase letters x, y, and z are positive integers, respectively.

It suffices that the small objects contact each other to build, in a network pattern, the properties of repelling water or the like that are possessed by the small objects. The small objects' repellency of water or the like is a phenomenon occurring by water contacting the surfaces of the small objects. Thus, it suffices that the property of repelling water or the like is present at least in the surface of each small object, or between the surface and the vicinity of the surface within the range of depth of about 10 micrometers to 1 nanometer. Of course, there is no problem if the entirety of each small object is made of a material having a property of repelling water or the like. As to the film thickness for providing a property of repelling water or the like, a portion having a thickness of about 1 nanometer is formed by a chemisorption method that is one of dip coating methods, and a portion having a thickness of about 10 micrometers can be obtained by a chemical vapor deposition method or a sputtering method.

Of course, the property of repelling water or the like can be exhibited even by an inorganic material. For example, it is well known that the surface of silicon is hydrophobic. This is thought to be because many functional groups of Si—H are exposed on the surface of silicon. However, it is thought that the silicon surface changes to be hydrophilic when a very thin film that is mainly composed of SiO and that is called a natural oxide film is formed thereon. Thus, an inorganic material can also be caused to sufficiently have a property of repelling water or the like depending on handling, but it is possible to provide a property of repelling water or the like also by an organic functional group. A spherical substance made of a fluorine resin and called beads and a similar substance made of a hydrocarbon material can be obtained, and these substances can be small objects having properties of repelling water or the like. In this case, of course, the fluorocarbon that forms the fluorine resin is exposed to the surface of each small object and its vicinity. In the case of the present invention, it suffices to have a property of repelling water or the like in the surface of each small object and its vicinity, and it is not necessary to particularly specify the material in the central part of each small object. Therefore, it is important that the properties of repelling water or the like that are possessed by the small objects are exhibited by the organic functional groups present in the surface of each small object and the vicinity of the surface.

There are various organic functional groups having properties of repelling water or the like, and typical functional groups are a hydrocarbon group and a fluorocarbon group. The two functional groups have properties of repelling water or the like. Here, a fluorocarbon functional group not only has a property of repelling water or the like but also can repel an organic liquid. Although the present invention provides the water storage structure, it is additionally described that it is thought that the same function is exhibited with respect to liquids other than water. Further, a hydrocarbon functional group has a property of repelling water or the like and also has a property of getting wet with an organic liquid. Due to this, although not directly related to the object of the present invention, it is additionally described that there is a possibility that a property of dividing liquids such as water and organic liquids will be exhibited in a form similar to the present invention.

Although it is preferred to have the above-mentioned organic functional groups of hydrocarbon and fluorocarbon in the surface of each small object and the vicinity of the surface, it has to be avoided that these effective organic functional groups disappear due to some causes such as passage of time. For that purpose, it is desirable to provide a certain chemical bond between these functional groups and the surfaces of the small objects to unify the functional groups and the surfaces of the small objects. Since the principal component of each small object is silicon oxide, a silicate, or an aluminosilicate, Si—O can be provided between the principal component, such as silicon oxide, and the organic functional groups. If this state can be formed, small objects can be formed in which organic functional groups having properties of repelling water or the like are chemically bonded and unified. Thus, it is thought that the possibility that the organic functional groups having properties of repelling water or the like will disappear decreases remarkably.

The water storage structure of the present invention is made of the collection of the small objects having properties of repelling water or the like. The targeted water does not refer to only normal water, and may be water dissolving a substance. Particularly, the water may contain a salt called a mineral. Since the present invention is intended for plant cultivation, the water may contain a fertilizer component required for plant cultivation. Even when these components are contained, the function of the present invention can sufficiently be exhibited. Further, the water may be a water dispersion. In other words, the water may contain a certain water-insoluble component. As these components, a water-insoluble fertilizer required for plant cultivation, and the like are assumed. Further, a metal oxide and the like can also be insoluble components.

As water to be stored, water of a river, rainwater, water produced by condensation of the moisture in the air, sprayed or drawn water, and the like can be assumed. In addition, the water storage structure of the present invention may be provided at a place where plants directly grow, or the water storage structure of the present invention may be provided at a place different from a place where plants grow and water stored therein may be supplied to the plants as necessary.

Although it is possible to retain water or the like with the water storage structure of the present invention, since the water-repellency of the surface of the water storage structure is rich, there is the possibility that liquids, such as water, will leak from the periphery of the water storage structure. Further, even though a recess is provided by slight inclination of the surface of the water storage structure, there is the possibility that the effect of the recess will become weak and water or the like will leak from the periphery. If the amount of water that the water storage structure can store is exceeded when it rains more than expected, there is also the possibility that the rainwater will flow out from the periphery and the amount of stored water will decrease. Therefore, in order to suppress those influences as much as possible and to secure a large amount of accumulating water, it is also necessary to suppress leakage by a substance that does not allow water or the like to pass therethrough to the peripheral part. The substance that does not allow water or the like to pass therethrough exerts its effect by contacting the outer periphery of the water storage structure. When the substance that does not allow water or the like to pass therethrough is laminated on the bottom of the outer peripheral part of the water storage structure, the effect may be further increased.

Since it is necessary to handle the substance that does not allow water or the like to pass therethrough for the above-mentioned purpose, the substance is desirably flexible sheet-shaped or rigid plate-shaped. As a material that does not allow water or the like to pass therethrough, polymer, glass, and metal are preferred, and wood may also be usable. When the surface of the material used is hydrophilic, even if water or the like does not pass through the sheet-shaped or plate-shaped substance, water or the like may leak while wetting the sheet-shaped surface, and cautions are required. In such a case, it is desirable to control surface wettability to change the surface to be hydrophobic.

It is shown that leakage of water or the like can be prevented by surrounding the outer periphery of the water storage structure with the above-mentioned substance that does not allow water or the like to pass therethrough. When a substance having wettability to water or the like is laminated on the surface of the water storage structure as another method, water or the like on the surface of the water storage structure can be adsorbed and retained by the substance having wettability to water or the like, and leakage of water or the like can be prevented. However, when the substance having wettability to water or the like is already in a saturated state of retention of water or the like, water or the like may leak. When the substance having wettability to water or the like is caused to retain water or the like, it is possible to suppress evaporation of water or the like by energy such as adsorption, and it is effective. When the substance having wettability to water or the like is installed so as to extend beyond the range of the water storage structure, there is a limit but water or the like may be retained also at a place where there is no water storage structure under the substance having wettability to water or the like. Thus, this may become effective as an emergency measure when a plant roots beyond the range of the water storage structure. Moreover, when a water storage section is water and an aqueous solution, the sizes of the small objects having water repellency are small, and the degree of the water repellency is high, a phenomenon may occur that the small objects having water repellency floats to the surface of the water or the like of the water storage section. When this phenomenon occurs, the thickness of a water-repellent layer composed of the small objects having water repellency decreases to cause leakage of water and the like. In order to suppress this decrease, it is effective to provide the substance having wettability to water or the like above the water-repellent layer.

As the above-mentioned substance having wettability to water or the like, an inorganic oxide and salt that contain silicon oxide, a silicate, or an aluminosilicate as a principal component are candidates. However, the substance may dissolve in water or the like due to the influence of pH, the inclusion of an aqueous solution, and the like, and cautions are required. Further, many materials, such as polyvinyl alcohol, polyacrylic acid, and polyacrylate, are being developed as water absorbing polymers and are fundamentally usable. However, when plant cultivation is intended, such a material may disturb the cultivation depending on the contained ionic species, and cautions are required.

The present invention is the water storage structure to water or the like, and is intended to secure water required for plant cultivation. Although the countermeasure for the water storage structure to prevent leakage of water or the like is taken, since the water storage structure is realized by the properties of repelling water or the like that are possessed by the small objects having no bonding properties, water or the like may temporarily leak for a certain reason. In order to prevent this as much as possible, it is also possible to make the water storage structure into two stages. If the number of stages increases, the effect of preventing this also increases, but there are many difficulties in light of production and it is thought that two stages are the limit in the manufacturing method assumed.

In the method for forming the water storage structure of the present invention, a process of providing a property of repelling water or the like, to the small objects, and a process of collecting the small objects within a certain range to make the small objects contact each other, are performed in order. Examples of processes that may be performed prior to these two processes include a process of extracting the small objects to which the property of repelling water or the like is to be provided, a process of measuring the states of the extracted small objects, a process of washing the small objects, a pretreatment process for making it easy to provide the property of repelling water or the like to the small objects, a process of drying the small objects, and a process of substituting the atmosphere of the small objects that is usual air with an inert gas. The washing process includes water washing, organic washing, ozone washing, ultrasonic washing, and acid washing, and proper use of them is needed. Further pretreatment processes include grain size sorting, foreign matter sorting, and oxidation treatment, and they are conducted as necessary according to the situation of the workplace. When the degree of the property of repelling water or the like that is originally provided to the small objects is inferior, washing and pretreatment for removing the property may be needed.

Examples of processes that may be performed between the process of providing the property of repelling water or the like to the small objects, and the process of collecting the small objects within the certain range to make the small objects contact each other include a process of washing the small objects, a process of evaluating the degree of the provision of the property of repelling water or the like to the small objects, a process of sorting out small objects whose degree of the provision is poor, and a process of putting the small objects on a predetermined place.

Further, examples of processes assumed after the process for making the small objects contact each other include a process of providing a recess on an upper surface of the water storage structure and a process of evaluating the water storage property of the created water storage structure. Here, as the process of providing the recess, a technique of removing the small objects for a predetermined depth at a predetermined place and a technique of pushing the upper surface of the water storage structure with a convex press mold, and the like can be considered. It is thought that it is possible to perform the process of providing the recess simultaneously with the process for making the small objects contact each other.

When the small objects previously exhibit properties of repelling water or the like, it is not necessary to newly provide a property of repelling water or the like to the small objects. When the small objects do not have properties of repelling water or the like, or when the properties are poor, it is necessary to newly provide a property of repelling water or the like to the small objects. Examples of a method for making a solution of a substance having a property of repelling water or the like contact the surfaces of the small objects include a dip coating method, a spray coating method, an applying method, and a cast method. In addition, examples of a method for providing energy to a substance having a property of repelling water or the like to apply the substance to the surfaces of the small objects include a thermal-spraying coating method, an electrostatic-coating method, a vacuum deposition method, and a sputtering method. Further, examples of a method for forming a substance having a property of repelling of the water or the like on the surfaces of the small objects to apply the substance to the surfaces of the small objects include an electrolytic polymerization method and a chemical vapor deposition method.

Examples of a method for making the small objects having properties of repelling of water or the like contact each other to form a surface or network state of a property of repelling water or the like include an operation of compressing the collected small objects, an operation of providing vibrations to the collected small objects, and an operation of wetting the surfaces of the small objects with a liquid that can wet the small objects and filling the liquid between the small objects, and then removing the liquid. Examples of the compressing operation include compression from a lateral direction, compression from a vertical direction, and a combination of these compressions. In addition, the provision of vibrations allows a dense collection of the small objects to be formed. Further, the filling of the liquid, which can wet the surfaces of the small objects, between the small objects and the removal of the liquid allow surface tension to be generated to make the small objects contact each other.

Hereinafter, embodiments of the present invention will be described in detail with reference to the drawings.

Embodiment 1

Figure 1:
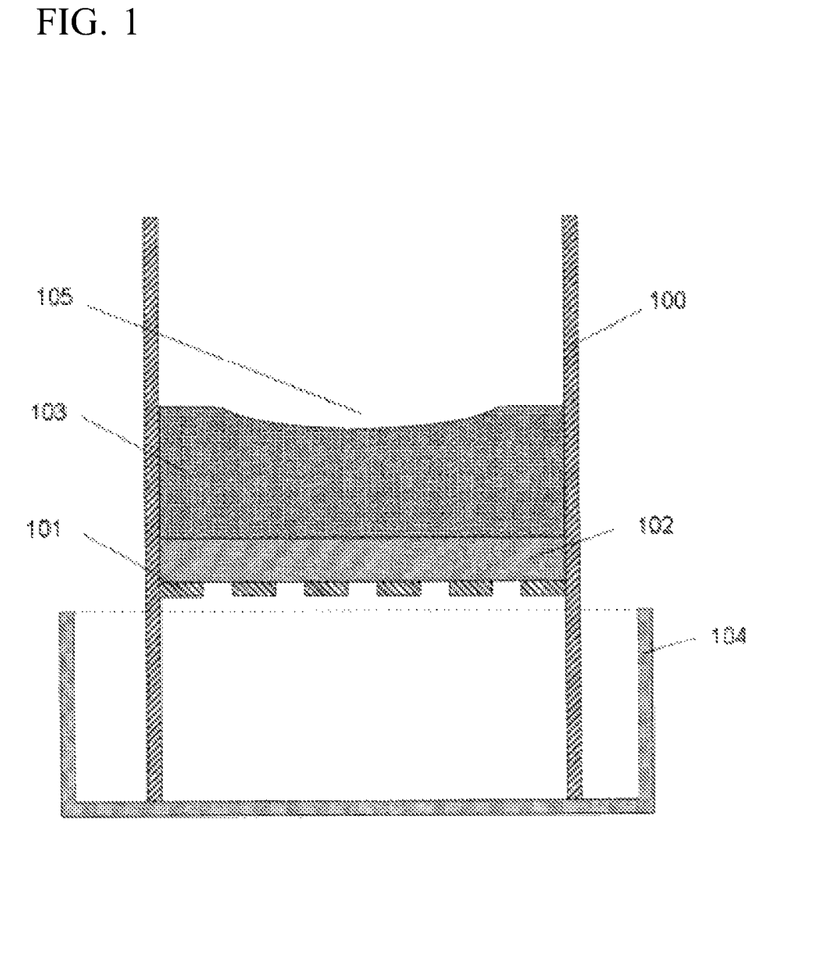
FIG. 1 is a cross-sectional schematic diagram of an evaluation device.
Figure 2:
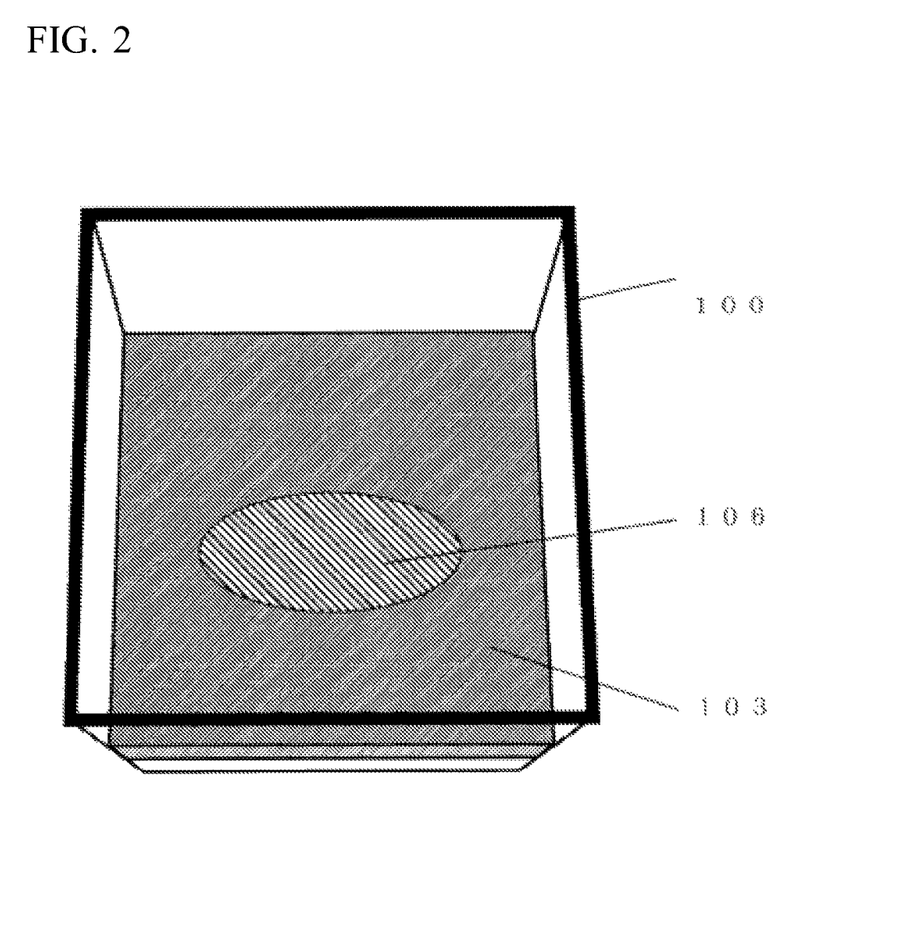
FIG. 2 is a view of the evaluation device as seen obliquely from the above, after water is dropped to the evaluation device having a water storage structure formed therein.

One embodiment of the present invention is illustrated in FIGS. 1 and 2. FIG. 1 is a cross-sectional schematic diagram of an evaluation device created for checking the effect of the water storage structure of the present invention. A frame 100 made of vinyl chloride (length: about 100 mm, width: about 80 mm, depth: about 80 mm) is created, and a water storage structure is located therein. In order to check the effect of the water storage structure, a plate 101 made of vinyl chloride is inserted at a position at a height of about 50 mm from the lower edge of the frame and has holes having a diameter of 3 mm that are arranged at intervals of 5 mm. If there is no effect of the water storage structure of the present invention and water passes through the water storage structure, leakage of water can be confirmed at the holes. In order to prevent the small objects constituting the water storage structure from coming out through the holes of the plate, a cotton 102 is put on the plate 101 made of the vinyl chloride. Cotton has a property of easily containing water. If no effect of the water storage structure is confirmed with the evaluation device and water passes through the water storage structure, the cotton immediately contains the water, and it can instantaneously be recognized that there is no effect. Of course, the cotton is provided for the purpose of preventing the small objects constituting the water storage structure from falling through the holes of the plate, and thus a hydrophobic material may be used instead of the cotton having a water containing property. When a hydrophobic material is used in the evaluation device, the effect of the small objects constituting the water storage structure and the effect of the hydrophobic material may work synergistically to provide a wrong evaluation. In order to prevent this, the cotton is used. Further, the above-mentioned device was created, and the small objects having properties of repelling water or the like were bedded on the cotton and pressed from the above to form a water storage structure 103. The thickness of the water storage structure is about 10 mm. It should be noted that a deep petri dish 104 is put under the bottom of the frame for receiving and checking leaking water. In addition, a spoon is pressed against the central portion of the water storage structure from above the water storage structure to form a recess 105.

FIG. 2 illustrates a state where water was dropped to the recess of the water storage structure in the evaluation device described with reference to FIG. 1, and is a view of the evaluation device as seen obliquely from the above. It was confirmed that water 106 was stored at the recess at the center of the water storage structure. In addition, it was also confirmed that there was no water leaking from the bottom of the water storage structure. Thus, it was confirmed that the water storage structure having the collected small objects repelling water or the like has a network structure formed therein and the effect of the water storage property is exhibited.

Figure 3:
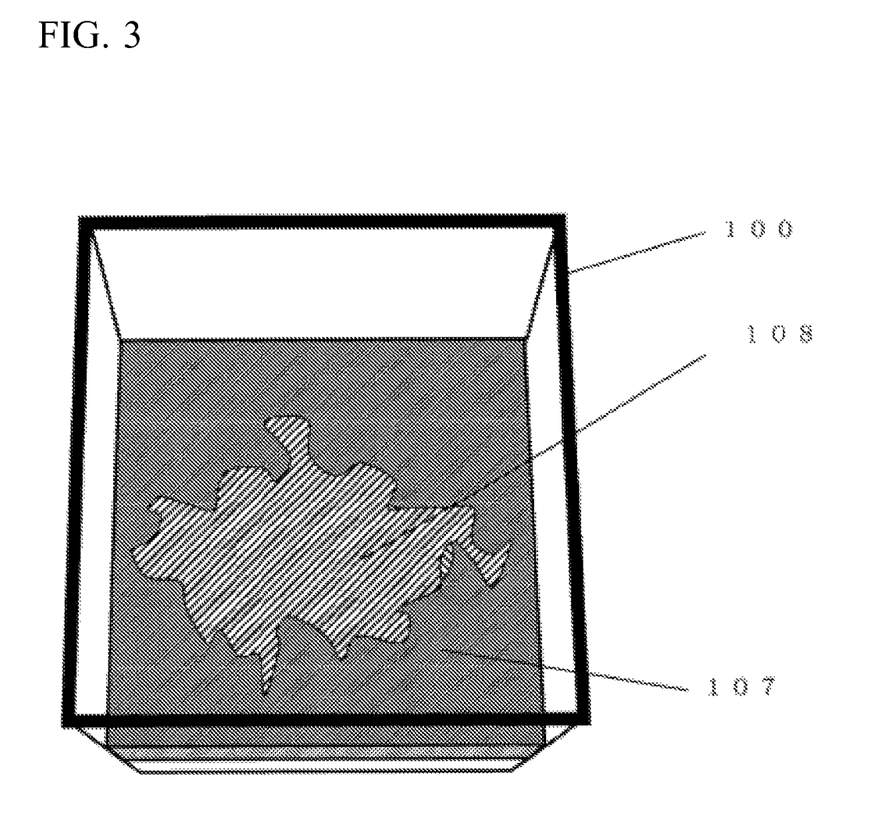
FIG. 3 is a view of the evaluation device as seen obliquely from the above, after a structure that does not have a property of repelling water or the like is formed in the evaluation device and water is dropped thereto.

Next, as a comparative experiment, instead of the water storage structure, a structure was created by using the evaluation device illustrated in FIG. 1 and small objects 107 that do not have properties of repelling water or the like, and a spoon was used similarly as described above, to form a recess. FIG. 3 is a view of the evaluation device for the comparative experiment as seen obliquely from the above, after water was poured to the recess. As a result of the dropping of water, the portion where the recess is provided changed in color as indicated by 108. In addition, the water was absorbed within the structure without forming water drops on the structure as shown in FIG. 2. It is recognized that the change in color occurred due to the water being soaked into the structure. The change in color spread beyond the range of the recess with time. When about 10 seconds elapsed, it was confirmed that water leaked through the holes of the plate made of the vinyl chloride that is located under the structure, and the water started to accumulate in a deep petri dish that is put for receiving water. It clearly indicates that water had passed through the structure.

In the present embodiment, the provision of the large recess allows the effect to be clarified. However, the same effect can be obtained even with a collection of small recesses. Further, it was confirmed that when there are small recesses in a large recess, a synergistic effect is provided.

Embodiment 2

Use of glass beads (manufactured by AS ONE Corporation, model number BZ-2) to form the small objects that form the water storage structure is considered. The size published in the catalog of this glass bead was 0.500 to 0.710 ϕmm. A degreasing treatment was conducted using an alcohol solvent and a ketone solvent to wash the purchased glass beads. Next, an operation was performed in which a primer coating material was applied to the surfaces of the glass beads for the purpose of making it easy to coat the surfaces of the glass beads with resin, and was continuously adhered to the surfaces of the glass beads within an oven. Next, a fluorine resin coating material was applied on the primer-treated surfaces and burned in oven similarly. It is confirmed that a fluorine resin coating of about 10 μm can be formed when these treatments are conducted on a plate glass, and thus it is inferred that a coating having substantially the same thickness is also formed on these glass beads. The fluorine resin coating materials used this time were coating materials commercially available from Daikin Industries, Ltd., AGC COATTECH CO., LTD., and the like, and were handled according to used material supplier's operation manuals. When these coating materials are used to form the small objects, a dip coating method, a spray coating method, a cast method, and a thermal-spraying coating method are recommended, and further, methods such as an electrostatic-coating method by a static electricity applying apparatus and a rubbing coating method using a rubbing apparatus or a rotation coating apparatus for uniformly coating an rugged surface can be used. In general, a coating material is attached to a to-be-coated surface, a solvent or a dispersion is dried, and a fluorine resin is melted by heat to form a coat. However, coating materials that form coats at room temperature are also marketed. In general, a primer is needed before applying a fluorine resin coating material. However, a coating material having self adhesiveness is also developed in recent years, and when this coating material is used, a primer is unnecessary and it is convenient.

The example where the glass beads are coated with the fluorine resin has been described so far. However, in order that the small objects have properties of repelling water or the like, it is not necessarily necessary to use a fluorine resin, and for example, and it is also possible to coat the glass beads with a hydrocarbon material. Examples of the hydrocarbon material for the coating include an epoxy resin coating material, a urethane resin coating material, an acrylic resin coating material, and a phthalate resin coating material. Typical coating material manufactures are Kansai Paint Co., Ltd., Nippon Paint Co., Ltd., and the like, and the above-mentioned methods can be used as these coating methods, but please refer to the operation manual of each coating material for details.

The above-mentioned coating materials and coating methods are common, and are thought to be easily handled in the present invention. However, of course, it is also possible to perform the coating by special methods, such as an electrolytic polymerization method, a vacuum deposition method, a chemical vapor deposition method, and a sputtering method. The electrolytic polymerization method is a method of forming a polymerization film on an electrode from a raw material by electrolysis. For example, when a supporting electrolyte is put into an acetonitrile solution of pyrrole and a voltage higher than the oxidation potential of pyrrole is applied from an electrode, electrolytic oxidation occurs in the electrode surface to form a polypyrrole thin film. The vacuum deposition method is a method in which a material is heated and evaporated in a vacuum to deposit the material on a substrate. For example, a substrate and perfluoro carboxylic acid that is a thin-film material are put into a vacuum chamber, and a degree of vacuum of $1 \times 10^{-3}$ Pa is provided. Then, the material is heated, whereby perfluoro carboxylic acid, which is the material, can be vapor-deposited on the substrate surface. The chemical vapor deposition method is a method in which a chemical reaction of a raw material is caused in a gaseous phase to deposit a film on a substrate. The sputtering method is a method in which a material is ejected by ionized atoms to deposit the material on a substrate. In addition to them, a plasma polymerization method, which is one of chemical vapor deposition methods, is also one of the important methods. For example, ethylene is poured in between parallel plate electrodes provided in a vacuum device, and glow discharge is caused to form a plasma polymerization film on the surface of a substrate.

The example where the glass beads are coated with the resin has been described for the small objects. However, other than the illustrated example, many glass beads having different sizes are marketed, and, of course, it is also possible to use them. Instead of the glass material, a metallic material can be coated with resin to form similar small objects. Examples of the metallic material include stainless steel and iron. Examples of materials other than the metallic material include carbon material and ceramics. Of course, the entirety of each small object may be a resin. For example, there are acrylic resin particles manufactured by Nippon Paint Co., Ltd., styrene resin particles manufactured by Sekisui Plastics CO., Ltd., and the like, and it was confirmed that the structure of the present invention that stores water or the like can be formed by using these particles.

Embodiment 3

When the above-mentioned glass beads are coated with a fluorine resin coating material, a coating film having a thickness of about 10 μm is formed. However, even if a thinner film is formed, the intended small objects can be made. SIN6597.6 manufactured by Gelest, Inc. is a linear fluorocarbon compound (nonafluorohexyltrichlorosilane) having a trichlorosilane group at an end, and is a very highly reactive material. Dry nitrogen was introduced to a reaction vessel to make the inside of a reactor into a relative humidity of 5% or less. In this state, a nonaqueous solution of MFS-17 (perfluoroether HFE-7200 manufactured by Sumitomo 3M Limited was used as a solvent, and a solution having a volume ratio of 1% was made) was poured into a beaker in the device. Then, the above-mentioned glass beads were put into the beaker to contact the solution. Since a uniform coating film was formed when all the surfaces of the glass beads contact the solution, agitation was continuously performed. After the contact operation for 10 minutes, the most solution was taken out from the beaker, and the glass beads were washed using the above-mentioned solvent. After the washing was ended, it was confirmed that the surfaces of the glass beads had dried within the reactor, and the glass beads were taken out from the inside of the reactor. In the device, a coating film made of SIN6597.6 was formed on the surfaces of the glass beads. It is inferred that the thickness of this coating film is substantially equal to the molecule length of SIN6597.6, and the thickness of the coating film is estimated to be about 0.9 nanometers. The component of the used glass beads is silicon oxide, and forms Si—O (silanol) bonds with the raw material, SIN6597.6.

In Embodiment 3, the solution was poured into the beaker, and the glass beads were put therein to cause the reaction. However, the reaction progresses if only conditions for making the raw material, SIN6597.6, and the glass beads contact each other are built. Thus, other than the contact with the solution, various reaction forms can be taken. Their examples include a method of forming mist of the solution to make the solution contact the glass beads, a method of forming a curtain of the reaction solution and making the glass beads pass therethrough, and a method of forming a vapor of the solution to make the solution contact the glass beads. In addition, with regard to washing, the washing solution was poured into the beaker to wash the glass beads, but other examples include a method of making the glass beads contact mist of the washing solution, a method of forming a curtain of the washing solution and making the glass beads pass therethrough, and a method of making the glass beads contact a vapor of the washing solution. It is also possible to conduct the reaction without using a beaker and the like. The reaction and washing can also be promoted using a supersonic wave or the like.

The small objects were able to be created even by similarly using SIT8174.0 manufactured by Gelest, Inc. The material is tridecafluoro-1,1,2,2-tetrahydrooctyltrichlorosilane, and the small objects can be created by the same method as described above. In the case of this material, the thickness of the coat is about 1.3 nanometers.

The same method applied to octadecyltrichlorosilane manufactured by Aldrich, whereby a hydrocarbon coat was able to be formed on the surfaces of the glass beads. In this case as well, the thickness of the coat is about 1.5 nanometers. When octadecyltrichlorosilane is used, it is not preferred to use the solvent described above, and it is preferred to use a silicon oil manufactured by Shin-Etsu Chemical Co., Ltd.

SIN6597.6, SIT8174.0, and octadecyl trichlorosilane have been illustrated in this embodiment. However, many chlorosilicane materials are marketed, and, of course, it is also possible to change the chlorosilicane material as appropriate depending on the purpose. In addition, other than the chlorosilicane material, an alkoxysilane material having an alkoxysilane group can be used. In the case of this material, since the reactivity is generally inferior to that of the chlorosilicane material, adding a heat treatment, a catalytic reaction, and the like to the reaction conditions as necessary has to be taken into consideration. Use of an alkoxysilane material to form a coating film is well known and reaction conditions can easily be known, and thus please refer to literatures and the like. Even when this material is used, Si—O (silanol) bonds are formed at least in a part.

Embodiment 4

Figure 4:
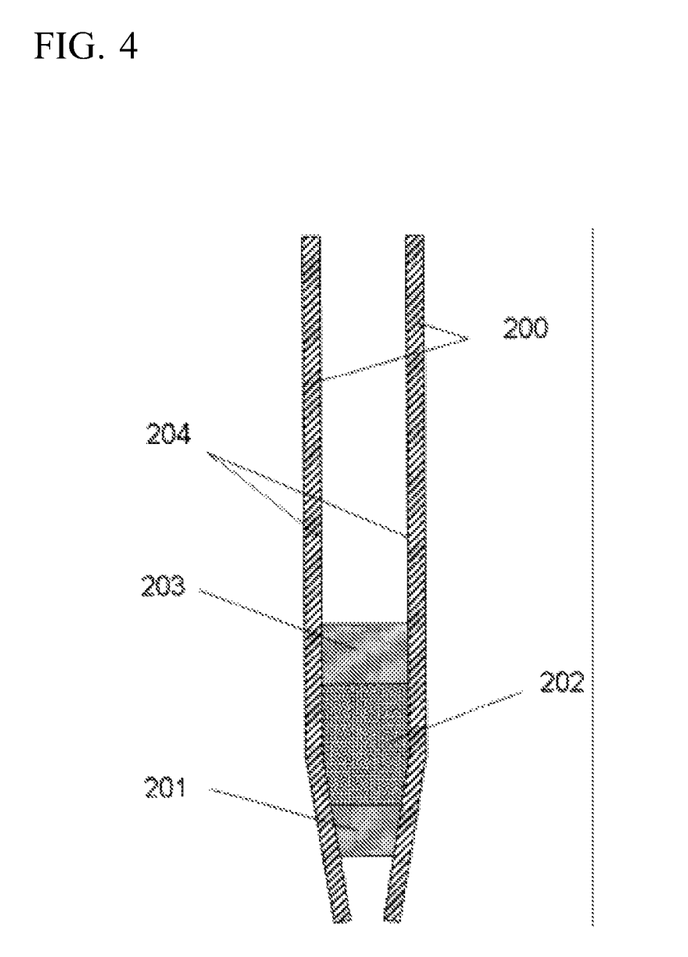
FIG. 4 is a cross-sectional schematic diagram of a performance evaluation model in which a water storage structure is formed in a glass pipette.
Figure 5:
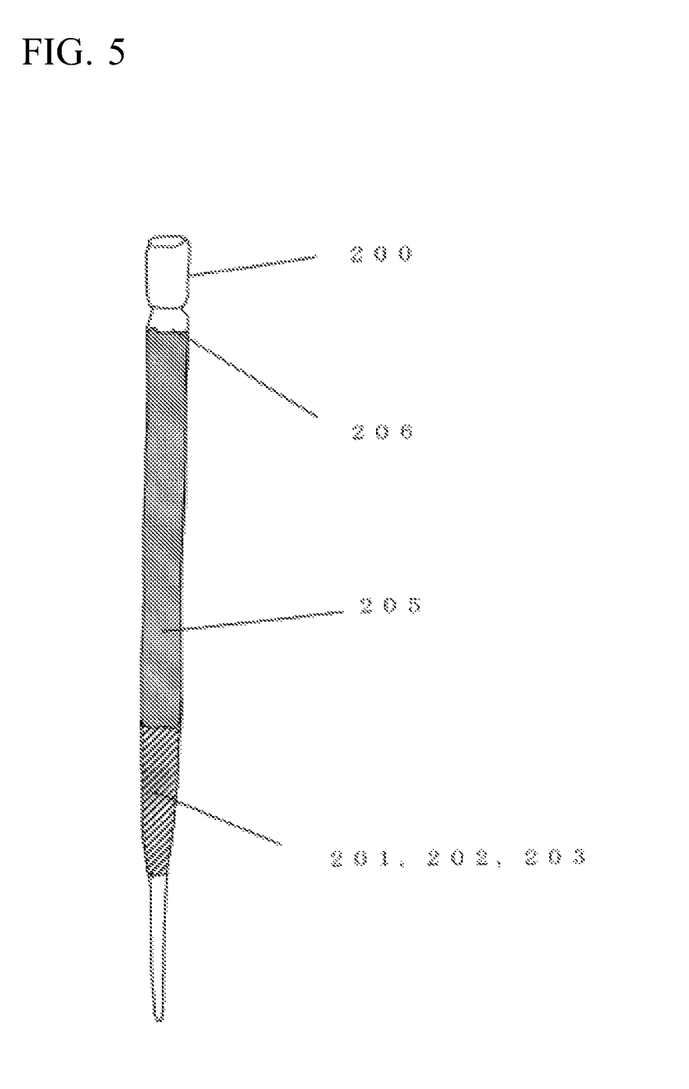
FIG. 5 is an illustration diagram of the performance evaluation model shown in FIG. 4, after water is poured into the performance evaluation model.

The surfaces of glass beads (105 to 125 ϕμm) manufactured by AS ONE Corporation were coated with the above-mentioned SIN6597.6 manufactured by Gelest, Inc. A water storage property was checked using the surface-coated glass beads and untreated glass beads. FIG. 4 is a cross-sectional schematic diagram of an evaluation model created for checking an effect. A glass pipette 200 that can take 2 ml was prepared, and an absorbent cotton 201 was put into the glass pipette on the sampling hole side and fixed at a thin portion near the sampling hole of the glass pipette. Next, about 0.1 cc of the above-mentioned coating-treated glass beads 202 was put in, and the same absorbent cotton 203 as described above was further put in on the glass beads 202. In this experiment, since a large amount of water was used for more clearly checking a water storage property, water was stored not only at a glass bead recess but also beyond the recess. As a result, a phenomenon occurred that water leaked along the glass wall of the glass pipette little by little with time. Thus, a water-repellent coating treatment was also conducted on the inner wall 204 of the glass pipette. Water was poured into this glass pipette. FIG. 5 is a diagram illustrating a state after water was poured into an effect evaluation model. As shown in FIG. 5, water 205 was stored by a water storage structure 203 that is composed of the coating-treated glass beads interposed between the absorbent cottons 201 and 202, the water level 206 was kept stably, and it was not confirmed that water leaked from the bottom of the glass pipette.

Next, comparative experiments were conducted. A glass pipette sample was created in which the water storage structure having the collected small objects that are the coating-treated glass beads is formed, and a glass pipette sample was also created in which a structure composed of untreated glass beads is formed as the comparison. The same amount of water was poured into the both glass pipette samples, and change of the water level was observed. The same water level was kept immediately after the water was poured into the both glass pipette samples. However, in the state after 15 seconds from the pouring of water, the water level in the glass pipette sample in which the untreated glass beads are put already began to fall, and it was confirmed that the water level fell by about 6 mm. Further, in the state after 45 seconds, the water level in the glass pipette sample of the structure composed of the small objects that are the untreated glass beads fell by about 30 mm. On the other hand, the water level in the glass pipette sample of the water storage structure composed of the small objects that are the coating-treated glass beads did not change at all. In the state after 95 seconds, the water level further fell by about 66 mm, and in the state after 180 seconds, the water level fell by 93 mm. Even after 180 seconds, there was no change of the water level in the glass pipette sample in which the water storage having the collected small objects that are the coating-treated glass beads is put, and the effect of the water storage property became clear. This can be said to be an effect of the structure having the collected small objects having properties of repelling water or the like. After the glass pipette sample that includes the water storage structure having the collected small objects that are the coating-treated glass beads was further left in this state for one week, fall of the water surface due to evaporation of water from the water surface was confirmed, but clear leakage of water was not recognized. An amount of water that is equal to the amount of the evaporated water was added and the state was observed further. Even when two months elapsed, only evaporation of water took place and downward leakage was not confirmed yet.

Since it was confirmed that water leaked along the inner wall of the glass pipette in this experiment, the water-repellent coating treatment was also conducted on the inner wall of the glass pipette. This is thought to be a phenomenon that may occur when the present invention is implemented, and it is thought that this may reduce the effect of the present invention. It is thought that it is necessary to cover by a substance that does not allow water or the like to pass therethrough as an actual measure. In this embodiment, the water-repellent treated glass wall and the small objects simply contacted each other, and such a substance was not put below the collection of the small objects. However, it is thought that it may be necessary to cover the bottom of the small objects with the substance that does not allow water or the like to pass therethrough, as necessary. It is thought that it is easy to handle a vinyl sheet and the like, and the shape of the substance that does not allow water or the like to pass therethrough is preferably a sheet shape or a plate shape. As its principal material, not only polymer but also the glass used in this embodiment can be used, and in addition, it is thought that metal and wood can be used.

Embodiment 5

The surface of sea sand (425 to 850 μm) manufactured by Wako Pure Chemical Industries, Ltd. was coated using the above-mentioned MFS-17 (heptadecafluoro-1,1,2,2-tetrahydrodecyltrichlorosilane) manufactured by Shin-Etsu Chemical Co., Ltd. A water storage property was checked using the surface-coated sea sand and untreated sea sand. This material is actually marine sand, and it was confirmed that as compared to the glass beads described above, the grain shape is mainly a spherical shape and some deformed shapes are included. It was confirmed that the sea sand comprises a collection of particles of which grain sizes have some distributions as compared to glass beads. Its material was silicate and aluminosilicate. A surface treatment was conducted on the sea sand to provide a coat having a property of repelling water, and formation of the water storage structure of the present invention was confirmed by using the devices shown in FIGS. 1 and 5. By using the experiment device in FIG. 1, untreated sea sand was overlaid with a thickness of 15 mm on the water storage structure (the thickness is about 15 mm) in which the small objects are the sea sand, to form a water storage structure. Since the surface of the untreated sea sand is hydrophilic, something like waterdrops as clearly confirmed in FIG. 3 did not occur, and water was absorbed into the untreated sea sand, but it was not confirmed that water leaked downward. The period during which the untreated sea sand retains the moisture is very long, but it is thought that even the untreated sea sand dries in some degree. However, the moisture was clearly confirmed even when two months elapsed, and the superior effect of the water storage structure composed of the collection of the small objects repelling water or the like was confirmed. Even when two months elapsed, downward leakage of water was not confirmed. It is thought that the use of the small objects including a plurality of types with some different grain shapes results in a network state of a property of repelling water or the like being formed more finely from the collection of the small objects. Further, it is thought that being composed of the collection of sand granules having a plurality of distributions in grain size results in the network state of a property of repelling water or the like being formed more finely.

Although the further effect of the water storage property was confirmed using the untreated sea sand in this experiment, the same effect was confirmed also with the absorbent cotton used in the above-mentioned experiment instead of the sea sand, and it is thought that when a water retention material is put on the water storage structure, the water storage effect is enhanced further.

Embodiment 6

When resin particles (about 15 μm) for gaps manufactured by Sekisui Chemical Co., Ltd. for the small objects were used to form a water storage structure and a water storage property was checked with the above-mentioned experimental device, a good water storage property was confirmed. When the particle diameter was small and the specific gravity of each particle was low, it was confirmed that a phenomenon occurred that the small objects floated in water. It is effective to put a water retention material on the top as a countermeasure to this, and it was confirmed that floating of the small objects was reduced.

It was also confirmed that when a plurality of water storage structures composed of small objects were stacked, the phenomenon of downward leakage was able to be reduced.

Embodiment 7

An octadecyltrichlorosilane material manufactured by Aldrich was used as a surface coating material to treat glass beads (grain size: 0.991 to 1.397 φmm) manufactured by AS ONE Corporation, to form small objects having properties of repelling water or the like, and the effect of a water storage structure was checked with the experiment device shown in FIG. 5. After water was poured in and one hour elapsed, fall of the water surface was not confirmed and leakage of water from the bottom of a glass pipette was also not confirmed. Therefore, it was confirmed that the same effect was provided also by the water repellency of the hydrocarbon material. In this case, when the same measure as in Embodiment 5 was additionally taken, the untreated glass beads on the water storage structure can retain water similarly as in Embodiment 5. Even when three weeks elapsed from the start of the experiment, it was confirmed that there was no downward leakage of water from the water storage structure, and the untreated glass beads still retained the moisture.

Embodiment 8

When dodecyltrichlorosilane (SID4630.0) manufactured by Gelest, Inc. was used as a surface coating material and the same examination as in Embodiment 6 was conducted, the same effect as in Embodiment 6 was confirmed.

Embodiment 9

Figure 6:
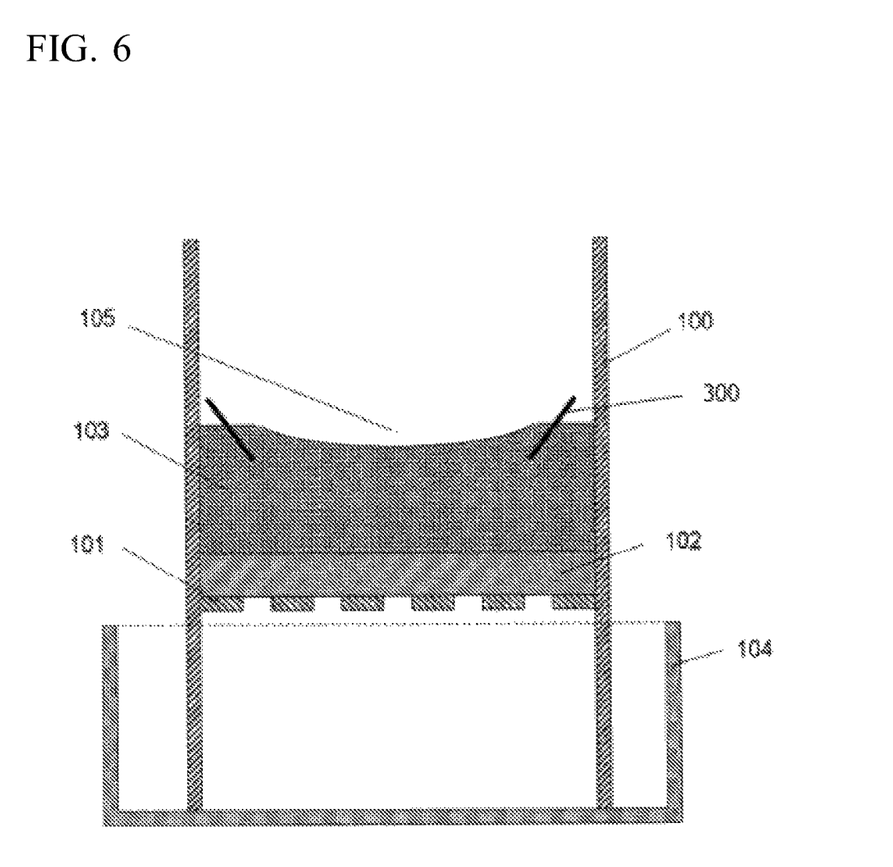
FIG. 6 is a cross-sectional schematic diagram of an evaluation device used in Embodiment 9.

The small objects used in Embodiment 8A were used to create a water storage structure in the evaluation device shown in FIG. 1. A vinyl sheet 300 that has, at its center, a hole slightly larger than a recess provided in the water storage structure was inserted such that the recess was located at the center. FIG. 6 illustrates its cross-sectional schematic diagram. A part of the vinyl sheet comes out of the water storage structure as shown in the drawing. Water was dropped to the recess of the water storage structure in the evaluation device, and it was confirmed that similarly as in Embodiment 1, water accumulated in the recess, was retained, and did not leak from the bottom. Then, water was further added until the water contacted the vinyl sheet. It was confirmed that the water was repelled by the vinyl sheet and did not move along the vinyl sheet and leak downward.

Embodiment 10

The same surface-treated sea sand as used in Embodiment 5 was used to conduct the evaluation experiment of the present invention. Using the same instrument as in FIG. 4, the thickness of sea sand was changed and the water retaining state was checked. Samples of five levels, 2 mm, 5 mm, 10 mm, 15 mm, and 20 mm for the thickness of sea sand were created, and water was poured in until the water level became 120 mm from the surface where the sea sand contacted the water. After 10 minutes from the end of the pouring of water, the evaluation was conducted. Leakage of water was checked at the tip of the pipette, the case where water leakage was confirmed is indicated by X, and the case where no water leakage was confirmed is indicated by O.

Table 1 summarizes the thickness of sea sand and the checking result of water leakage.

TABLE 1

| Thickness of sea sand | Confirmation of water leakage | | |
|---|---|---|---|
| 2 mm | X | X | X |
| 5 mm | X | X | O |
| 10 mm | X | X | O |
| 15 mm | O | O | O |
| 20 mm | O | O | O |

When the thickness of sea sand was 2 mm, leakage of water was clearly confirmed. On the other hand, when the thickness of sea sand was 15 mm, leakage of water was not confirmed. Therefore, in this experiment, it is possible to keep a 120 mm water level with a sea sand thickness equal to or larger than 15 mm. In this experiment, since it is thought that a result changes depending on the degree of the surface treatment, the sizes of the small objects, the height of the water level, and the like, this result is not absolute. However, it can be determined that a water storage property is exhibited by a sequence of some small objects in the depth direction, and change of the phenomenon is the same.

Figure 7:
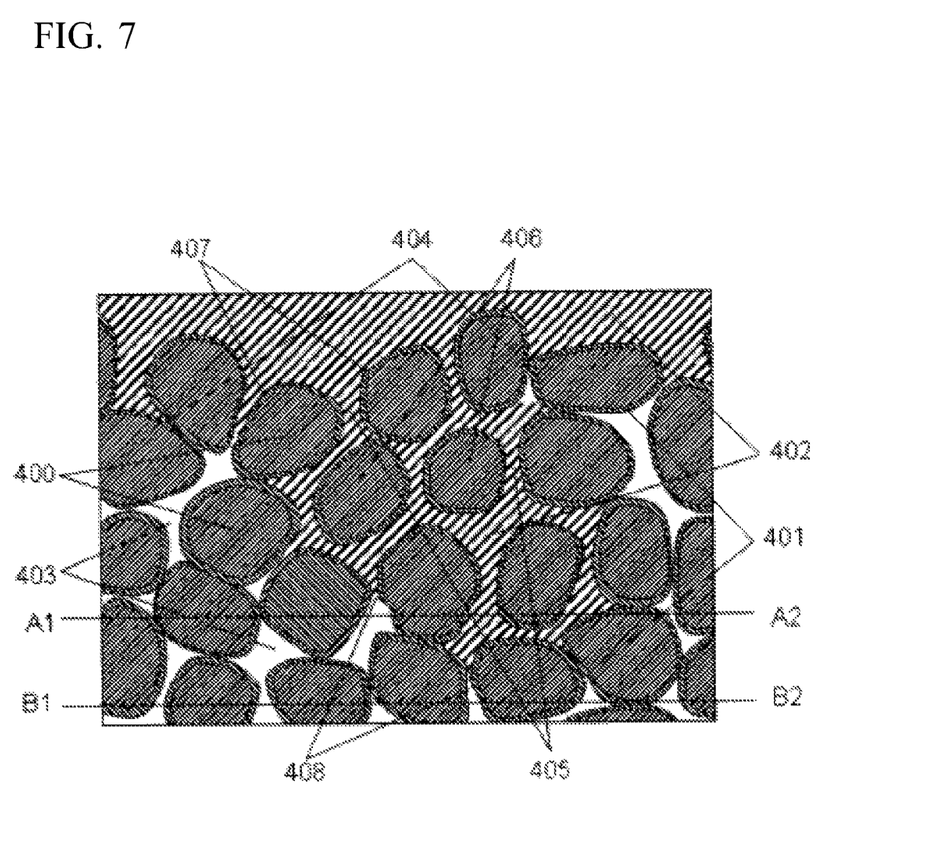
FIG. 7 is an examination diagram of an evaluation experiment conducted in Embodiment 10.

FIG. 7 is an examination diagram obtained as a result of inferring and examining the state of sea sand from the result of this experiment. This diagram is an enlarged cross-sectional view of a part where the water storage structure of the present invention contacts water. Reference numeral 400 denotes sea sand grains, reference numeral 401 denotes parts where a surface treatment for repelling water or the like is conducted on the surfaces of the sea sand grains. Reference numeral 402 denotes a state of water when the water is poured in from the above of the water storage structure composed of the above sea sand. Reference numeral 403 denotes air that is thought to be present between gaps in the water storage structure composed of the above sea sand. At parts 404 where the surface-treated sea sand grains are packed and the surface-treated parts of the sea sand grains contact each other, the water poured from the above of the water storage structure does not pass downward therethrough. Meanwhile, it is thought that at parts 405 where there are gaps between the sea sand grains, the water easily passes therethrough. Therefore, it is appropriate to think that even when the peripheries of the sea sand grains are subjected to a repellent treatment, the sea sand grains may be entirely surrounded by water like the sea sand grains indicated by 406. When the same surface treatment for repelling water or the like is conducted on a glass plate, not on sea sand, water is dropped on the surface, and the glass plate is gradually inclined, a phenomenon occurs that the water is at rest on the glass plate against the gravity and then, at a certain angle, the water drops cannot remain at rest and slide down. This phenomenon occurs on the basis of the balance between the gravity and the force that blocks the water from sliding on the glass plate surface that repels water or the like, and when the angle increases and the gravity exceeds the force, the water slides down. This angle is referred to as a sliding angle. This angle changes depending on the degree of the water repellency by the surface-treated glass plate. At parts indicated by 407 in the examination diagram of FIG. 7, the force that blocks the water from moving in the direction of gravity is applied. It is thought that there are many parts similar to the parts indicated by 407 in FIG. 7, forces generated at these parts gather, and the synergistic effect with the parts indicated by 404 is provided, thereby exhibiting a water storage property. Even when a water path becomes a funnel shape as a result of multiple sea sand grains gathering as indicated by 408, or water is surrounded as indicated by 407 to form gaps through which water may pass, if the force that blocks the water from sliding down on the sea sand surface exceeds the gravity that pulls water downward, it is thought that the water does not fall through the gaps. It is thought that this phenomenon is influenced by the degree of the surface treatment for repelling water or the like and the sizes of the gaps. It is thought that when the gaps increase in size, the gravity applied to the water becomes greater than the force that blocks the water from sliding down, and the water pass through the gaps.

On the other hand, when sea sand on which a surface treatment for repelling water or the like is not conducted is used, it is thought that the sea sand surface is wet with water, and thus there is no force that blocks the water from sliding down and the water passes through gaps due to the gravity while wetting the sea sand surface.

When the evaluation experiment of Embodiment 10 is considered from the above-mentioned discussion, if the collection of sea sand grains in FIG. 7 has a thickness from the part where the sea sand grains contacts the water to A1-A2, the water passes through the sea sand grains since the water reaches A1-A2. On the other hand, when the collection of sea sand grains has a thickness to B1-B2, the water does not pass though the sea sand grains and the water storage property is maintained, since the water does not reach B1-B2. It is thought that when the thickness of the sea sand in Embodiment 10 was 2 mm, it was in a state at A1-A2 in FIG. 7, and when the thickness of the sea sand in Embodiment 10 was 10 mm, it was in a state at B1-B2 in FIG. 7.

INDUSTRIAL APPLICABILITY

In the water storage structure according to the present invention, the separable small objects having properties of repelling water or the like are collected to make the small objects contact each other, whereby the network structure of the property of repelling water or the like can be provided. As a result, when the water storage structure is provided at a place where to form plants or as a storage reservoir near the place where to form plants, it is possible to store water that is essential for growth of plants.

Particularly, the water storage structure of the present invention can efficiently and averagely supply stored water to plants, when a water storage structure is formed which has a configuration in which objects made of a material having wettability to water or the like are overlaid on the water storage structure. Further, the water storage structure of the present invention is adaptable to the case where plants growing in the future root more widely.

It should be noted that when the water storage structure of the present invention is accessorily surrounded with a substance that does not allow water or the like to pass therethrough in order to prevent water or the like excessively stored in the water storage structure from leaking from the water storage structure through the periphery of the water storage structure, the water storage structure can store the excessively collected water or the like without leakage.

Further, in the forming method of the present invention, a pressure is applied to the collection of the small objects having properties of repelling water or the like, whereby it is possible to two-dimensionally form a substantially continuous structure of a property of repelling water or the like and further to three-dimensionally form a network structure.

Although emphasis is put on securing water for plants as the effect of the invention, of course, it is also possible to secure water that is used for drinks of livestock or human, and the present invention is applicable to use in which water is used in many ways even at places where water has not been able to be secured.

The present invention has industrial applicability from the above-mentioned reasons.

DESCRIPTION OF THE REFERENCE CHARACTERS 100 frame made of vinyl chloride
101 plate made of vinyl chloride and having holes with a diameter of 3 mm that are arranged at intervals of 5 mm
102 cotton for preventing small objects from coming out through holes of the plate 101
103 water storage structure
104 deep petri dish
105 recess provided in water storage structure
106 water stored at recess
107 structure using small objects that do not have property of repelling water or the like
108 portion that changes in color due to dropped water
200 glass pipette
201 absorbent cotton
202 glass bead
203 absorbent cotton
204 inner wall of glass pipette 200
205 poured water
206 water level
300 vinyl sheet
400 sea sand grain
401 part that is surface-treated for repelling water or the like
402 water
403 air
404 part where surface-treated parts of sea sand grains contact each other
405 part where there are gaps between sea sand grains
406 sea sand grain surrounded entirely by water
407 part to which force blocking water from moving in direction of gravity is applied
408 part where multiple sea sand grains gather such that a water path becomes a funnel shape

What is claimed is:
1. A water storage structure comprising:
a water-repellent layer having a water-repellent surface;
a recess defined by an upper surface of the water repellent layer; and
a flexible sheet disposed at an outer periphery of the recess, the flexible sheet defining a hole larger than the recess, wherein the water-repellent layer and the flexible sheet are configured to store free standing water in the recess, wherein the water-repellent layer includes bedded objects having water repellency in surfaces thereof and which are separable from each other, wherein the objects contact each other at multiple points and a contact angle formed on the surface of each object with water exceeds 90 degrees to form a configuration that prevents water from passing through the water-repellent layer, wherein the flexible sheet is configured to prevent water from leaking at the outer periphery of the recess, and wherein the size of each of the objects is 425 to 850 µm.

2. The water storage structure of claim 1, wherein each of the objects is coated with heptadecafluoro-1,1,2,2-tetrahydrodecyltrichlorosilane.

3. The water storage structure of claim 1, wherein the shapes of the objects are substantially spherical, wherein a property of repelling water that is possessed by each of the objects is present at least in a surface of each of the objects or between the surface and a vicinity of the surface within a range of depth of about 10 micrometers to about 1 nanometer, and wherein the objects are formed of silicon oxide or aluminosilicate.

4. The water storage structure of claim 1, wherein the shapes of the objects are substantially spherical.

5. The water storage structure of claim 1, wherein a property of repelling water that is possessed by each of the objects is present at least in a surface of each of the objects or between the surface and a vicinity of the surface within a range of depth of about 10 micrometers to about 1 nanometer.

6. The water storage structure of claim 1, wherein the objects are formed of silicon oxide or aluminosilicate.

7. A water storage structure comprising:

a water-repellent layer having a water-repellent surface;

a recess defined by an upper surface of the water repellent layer; and a flexible sheet disposed at an outer periphery of the recess, the flexible sheet defining a hole, wherein the water-repellent layer and the flexible sheet are configured to store free standing water in the recess, wherein the water-repellent layer includes bedded objects having water repellency in surfaces thereof and which are separable from each other, wherein the objects contact each other at multiple points and a contact angle formed on the surface of each object with water exceeds 90 degrees to form a configuration that prevents water from passing through the water-repellent layer, wherein the flexible sheet is configured to prevent water from leaking at the outer periphery of the recess, wherein the size of each of the objects is 425 to 850 µm, and wherein each of the objects is coated with a hydrocarbon or a fluorocarbon which provides a water repelling property.

8. The water storage structure of claim 7, wherein the shapes of the objects are substantially spherical, wherein a property of repelling water that is possessed by each of the objects is present at least in a surface of each of the objects or between the surface and a vicinity of the surface within a range of depth of about 10 micrometers to about 1 nanometer, and wherein the objects are formed of silicon oxide or aluminosilicate.

9. The water storage structure of claim 7, wherein the shapes of the objects are substantially spherical.

10. The water storage structure of claim 7, wherein a property of repelling water that is possessed by each of the objects is present at least in a surface of each of the objects or between the surface and a vicinity of the surface within a range of depth of about 10 micrometers to about 1 nanometer.

11. The water storage structure of claim 7, wherein the objects are formed of silicon oxide or aluminosilicate.

12. A water storage structure comprising:

a water-repellent layer having a water-repellent surface;

a recess defined by an upper surface of the water repellent layer; and a flexible sheet disposed at an outer periphery of the recess, the flexible sheet defining a hole larger than the recess, wherein the water-repellent layer and the flexible sheet are configured to store free standing water in the recess, wherein the water-repellent layer includes bedded objects having water repellency in surfaces thereof and which are separable from each other, wherein the objects contact each other at multiple points and a contact angle formed on the surface of each object with water exceeds 90 degrees to form a configuration that prevents water from passing through the water-repellent layer, wherein the flexible sheet is configured to prevent water from leaking at the outer periphery of the recess, wherein the size of each of the objects is not less than 0.015 mm and not more than 2 mm, and wherein each object has an organic functional group present in the surface thereof, and the organic functional group provides a water repelling property.

13. The water storage structure of claim 12, wherein the shapes of the objects are substantially spherical, wherein a property of repelling water that is possessed by each of the objects is present at least in a surface of each of the objects or between the surface and a vicinity of the surface within a range of depth of about 10 micrometers to about 1 nanometer, and wherein the objects are formed of silicon oxide or aluminosilicate.

14. The water storage structure of claim 12, wherein the shapes of the objects are substantially spherical.

15. The water storage structure of claim 12, wherein a property of repelling water that is possessed by each of the objects is present at least in a surface of each of the objects or between the surface and a vicinity of the surface within a range of depth of about 10 micrometers to about 1 nanometer.

16. The water storage structure of claim 12, wherein the objects are formed of silicon oxide or aluminosilicate.

* * * * *